(No Model.)
E. POMEROY.
SPREADER AND STOPPER FOR BOTTLES.
No. 399,927. Patented Mar. 19, 1889.
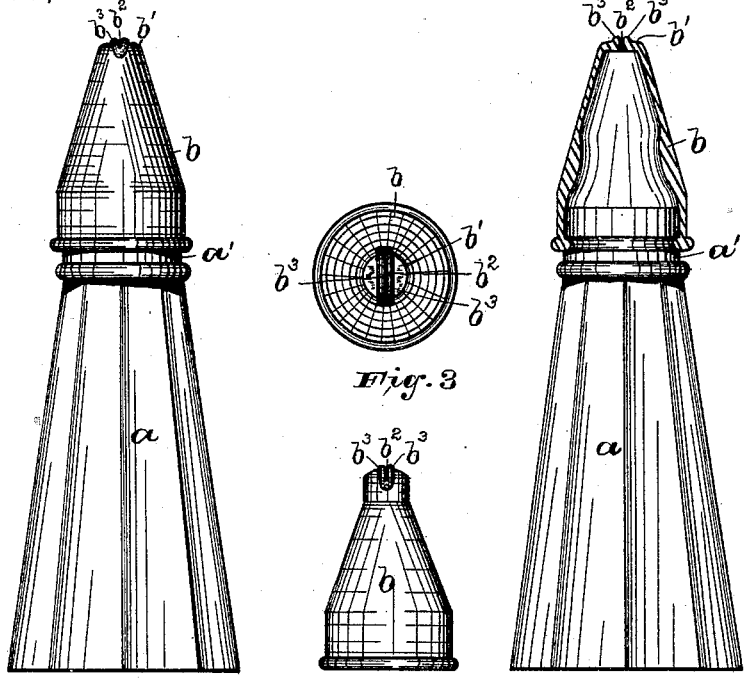
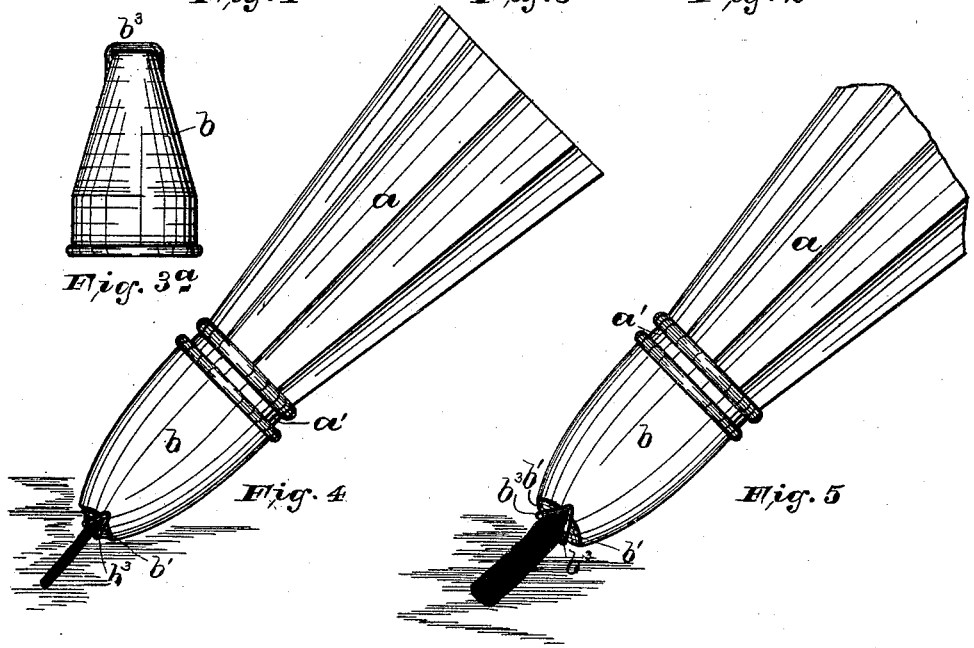
WITNESSES:
INVENTOR:
Eltweed Pomeroy.
BY Campbell & Co. ATTYS

UNITED STATES PATENT OFFICE.

ELTWEED POMEROY, OF NEWARK, NEW JERSEY.

SPREADER AND STOPPER FOR BOTTLES.

SPECIFICATION forming part of Letters Patent No. 399,927, dated March 19, 1889.

Application filed January 28, 1889. Serial No. 297,846. (No model.)

*To all whom it may concern:*

Be it known that I, ELTWEED POMEROY, a citizen of the United States, residing at Newark, in the county of Essex and State of New Jersey, have invented certain new and useful Improvements in a Combined Spreader and Stopper for Bottles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The primary object of this invention is to provide a combined spreader and stopper for mucilage and other bottles, which will serve for either purpose, and which is of such construction that when in use the flow of the mucilage or other fluid may be regulated and at the same time permit an even distribution of the liquid from the discharge opening or slit upon the surface to which it is to be applied.

The invention is further designed to provide a spreader with a re-enforced discharge-opening in the top thereof having strengthening-ridges around the same, which prevent the tearing of the slit when in constant use, said ridges also being provided to guide the user in cutting the opening and to prevent him from making a slit which might be too large.

In the accompanying sheet of drawings, in which similar letters of reference indicate corresponding parts in each of the views, Figure 1 is a front elevation of my improved stopper applied to an ordinary mucilage-bottle. Fig. 2 is a view similar to Fig. 1, the spreader and stopper being shown in section. Fig. 3 is a top view of the combined stopper and spreader, and Fig. 3$^a$ is a side elevation of the same. Figs. 4 and 5 are top views of a bottle and spreader, illustrating the manner of using the spreader in applying the contents and showing the discharge opening or slits spread apart to different degrees to permit a decreased or increased flow of the liquid therethrough, as may be desirable. Fig. 6 represents a modified form of spreader.

In the above-described views, $a$ indicates the body of the bottle, which may be of any desirable form, adapted to receive the combined spreader and stopper $b$, which is hollow and is made of flexible material and adapted to fit over or slip onto the neck $a'$ of the bottle. The spreader is preferably formed with a flat surface, $b'$, on the top thereof, thus having the appearance of a frustum of a cone, as shown in Figs. 1 and 2, &c. The flat surface on the top of the spreader is provided with a slit, $b^2$, extending diagonally across the top and part way down the opposite sides of the spreader, as shown more clearly in Figs. 1 and 3$^a$, and is provided with a strengthening ridge or rib, $b^3$, around the opening or slit, to prevent the tearing of the same when in constant use.

As shown in Fig. 6, the spreader may be provided with a round top instead of a flat surface, said top being provided with a slit, as described.

The spreader being made of a flexible material—such as rubber—operates to normally close the discharge-opening, thereby preventing the admission of air or any escape of the contents.

In order to apply the fluid to a surface, the bottle is inverted and a pressure brought to bear upon one end of the opening in the spreader and directed toward the other end of the opening. By varying the degree of pressure the discharge from the slit may be regulated and a narrow stream or a wide stream produced upon the surface, as will be clearly understood from Figs. 4 and 5. As soon as the pressure is removed from the spreader the elasticity of the material will cause the spreader to resume its normal shape, and thereby close the discharge-opening.

As shown in the drawings, the slit extends across the top of the spreader and preferably down the opposite sides of the same; but I do not wish to limit myself to this construction, as the slit may extend merely across the top of the spreader and may be provided with or without the strengthening-ridges, as may be desirable.

It will be understood that the herein-described combined stopper and spreader is put on the market uncut on the top, thus avoiding the use of the ordinary cork to prevent the flow of the liquid from the bottle.

When it becomes necessary to put the bottle to use, the stopper is pierced with a penknife and a slit is cut across the top of the same between the ridges by the operator, the ridges serving to prevent the operator from cutting too large a slit into the stopper.

Having thus described my invention, what I claim is—

1. A combined spreader and stopper for liquid-receptacles, having a slit across the truncated top of the spreader, for the purposes set forth.

2. A combined stopper and spreader for liquid-receptacles, having a slit across the truncated top of the spreader and provided with strengthening ridges or ribs around said slit, for the purposes set forth.

3. A combined spreader and stopper for liquid-receptacles, having a slit and strengthening ridges or ribs around the same, said slit and ridges extending across the top and part way down the opposite sides of the spreader, substantially as and for the purposes set forth.

In testimony that I claim the invention set forth above I have hereunto set my hand this 25th day of January, 1889.

ELTWEED POMEROY.

Witnesses:
FREDK. C. FRAENTZEL,
C. R. HOAG.